V. G. BRUBER.
GATE LATCH.
APPLICATION FILED SEPT. 28, 1916.
1,338,209. Patented Apr. 27, 1920.
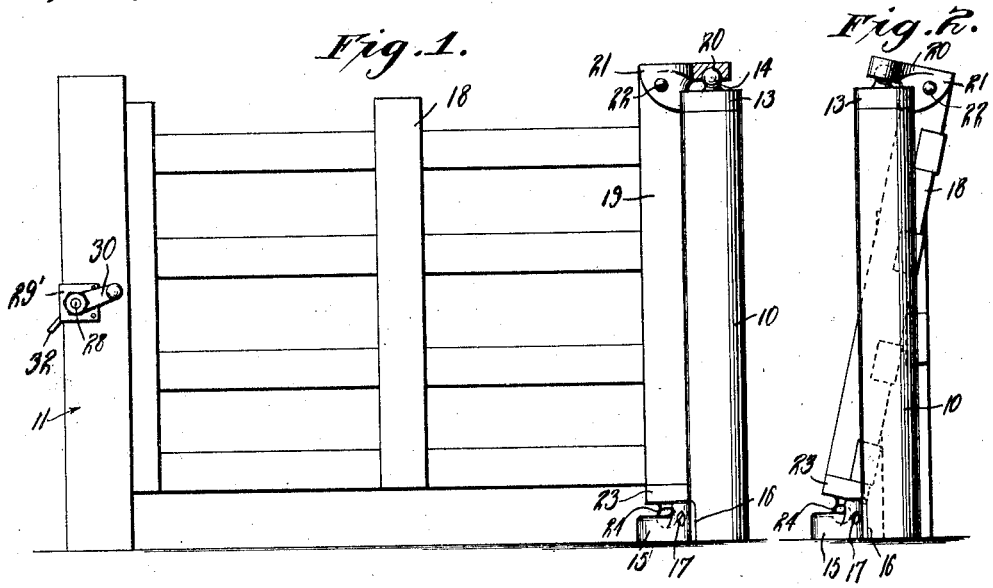
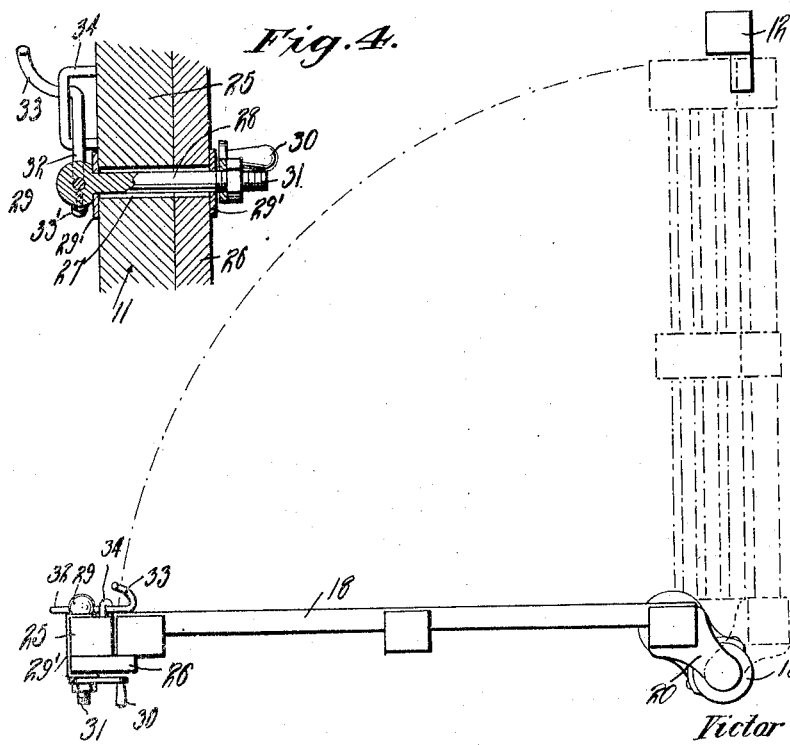
INVENTOR
Victor G. Bruber
WITNESSES
W. C. Fielding
Wade Koontz
BY Richard B. Owen
ATTORNEY

UNITED STATES PATENT OFFICE.

VICTOR G. BRUBER, OF RUCKER, MINNESOTA.

GATE-LATCH.

1,338,209. Specification of Letters Patent. Patented Apr. 27, 1920.

Application filed September 28, 1916. Serial No. 122,712.

*To all whom it may concern:*

Be it known that I, VICTOR G. BRUBER, a citizen of the United States, residing at Rucker, in the county of Morrison and State of Minnesota, have invented certain new and useful Improvements in Gate-Latches, of which the following is a specification.

This invention relates to gate fastenings and consists of certain novel constructions, combinations and arrangement of parts, as will be hereinafter fully described and claimed.

In the drawings:

Figure 1 is a side elevational view of the improved device.

Fig. 2 is a view in end elevation of the gate when in a full open position.

Fig. 3 is a top plan view of the device as shown in Fig. 1, a full open position of the same being indicated.

Fig. 4 is a vertical sectional view of a shutting post with the improved form of latching means in connection therewith.

Referring to the parts by reference numerals. A shutting post 11 comprises a main portion 25 and a gate abutment strip 26, the same projecting beyond one edge of the main portion 25 of the post for engagement with the gate to limit the closing movement thereof. A bore 27 is formed in the post 11 and positioned in the same is a bolt 28 that extends through the plates 29 and 29' which are positioned on opposite sides of the post 11 adjacent the bore 27. One end of the bolt has mounted thereon the operating crank 30 which is held in the desired position by the nut 31 and on the other end of the bolt 28 the same is enlarged as at 29 having a bore therethrough which carries the latch 32. A set screw is carried by the enlarged portion 29 of the bolt 28 and engages a portion of the latch that is passed through the bore in the enlargement 29 to adjustably retain the latch in engagement with the bolt. The latch comprises an angularly extending gate engaging portion 33 that is bent so as to present a curved surface for the gate to abut when moving to a closed position and a staple 34 is provided through which the latch is passed to limit the movement of the latch.

It is obvious that minor changes may be made in the form and construction of this invention without departing from the material parts thereof. It is therefore not wished to confine the invention to the exact form herein shown and described, but it is wished to include all such as properly come within the scope claimed.

I claim—

In combination, a post comprising main and gate abutment members having registering openings, plates at the outer side of the members in line with the openings thereof, a bolt mounted in the openings and passing through the said plates, one end of the bolt being enlarged to form a head and having intersecting openings and the other end of the bolt being threaded, an operating crank mounted on the threaded end of the bolt, a nut on the threaded end of the bolt to retain the bolt and operating crank in position, a latch adjustable in one of the openings of the bolt head and having an angularly and laterally curved gate engaging portion, and a set screw in the remaining opening of the bolt head to retain the latch in adjusted position.

In testimony whereof I affix my signature in presence of two witnesses.

VICTOR G. BRUBER.

Witnesses:
R. M. STOLL,
A. M. SCHENEDER.